US008200764B2

(12) United States Patent
Quinn et al.

(10) Patent No.: US 8,200,764 B2
(45) Date of Patent: Jun. 12, 2012

(54) SYSTEM AND METHOD FOR ACHIEVING HIGHLY SCALABLE REAL-TIME COLLABORATION APPLICATIONS USING HTTP

(75) Inventors: William M. Quinn, Lexington, KY (US); Erik J. Burckart, Raleigh, NC (US); Brian G. Cline, Hebron, KY (US); James P. Galvin, Jr., Georgetown, KY (US); Christopher D. Price, Georgetown, KY (US); Thomas Schaeck, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1187 days.

(21) Appl. No.: 11/612,766

(22) Filed: Dec. 19, 2006

(65) Prior Publication Data

US 2008/0147834 A1      Jun. 19, 2008

(51) Int. Cl.
  *G06F 15/16* (2006.01)
(52) U.S. Cl. .................. 709/206; 709/204; 709/207
(58) Field of Classification Search .................. 709/224, 709/230, 204, 205, 206, 207
See application file for complete search history.

(56) References Cited

U.S. PATENT DOCUMENTS

| | | | | |
|---|---|---|---|---|
| 6,070,184 A | * | 5/2000 | Blount et al. | 709/200 |
| 6,240,444 B1 | * | 5/2001 | Fin et al. | 709/205 |
| 7,631,084 B2 | * | 12/2009 | Thomas et al. | 709/227 |
| 2002/0042830 A1 | * | 4/2002 | Bose et al. | 709/230 |
| 2002/0052932 A1 | * | 5/2002 | Curtis et al. | 709/218 |
| 2002/0065912 A1 | * | 5/2002 | Catchpole et al. | 709/224 |
| 2005/0053018 A1 | * | 3/2005 | Hoppe-Boeken et al. | 370/260 |
| 2005/0114509 A1 | * | 5/2005 | Dahlman et al. | 709/225 |
| 2005/0218739 A1 | * | 10/2005 | Maddin et al. | 310/120 |
| 2005/0246634 A1 | * | 11/2005 | Ortwein et al. | 715/530 |
| 2006/0026502 A1 | * | 2/2006 | Dutta | 715/511 |
| 2006/0080432 A1 | * | 4/2006 | Spataro et al. | 709/224 |

\* cited by examiner

*Primary Examiner* — Saleh Najjar
*Assistant Examiner* — Tae Kim
(74) *Attorney, Agent, or Firm* — Raymond Szeto; Hoffman Warnick LLC

(57) ABSTRACT

A highly scalable and highly responsive RTC system uses asynchronous or non-blocking I/O and HTTP response queuing to avoid server overload. The system distinguishes between two types of requests: an update request and a change request. An update request is a request used to fetch an update or change notification. A change request is a request to change some data related to the real-time session. For a given RTC session, the server first checks whether any updates exist for an update request. If an update exists, the server code can send an immediate response to the client. However, if no update exists, the server code application sets a well-defined HTTP response header, and then responds. Once the server code application responds, all application server resources are freed, and the application server is free to handle the next requests without blocking any thread.

9 Claims, 9 Drawing Sheets

SYSTEM AND METHOD FOR ACHIEVING HIGHLY SCALABLE REAL-TIME COLLABORATION APPLICATIONS USING HTTP

FIELD OF THE INVENTION

The invention relates generally to real-time collaboration, and, more particularly, to a system and method for achieving highly scalable real-time collaboration applications using HTTP.

BACKGROUND OF THE INVENTION

Real-time collaboration (RTC) can be of different forms, such as instant messaging (IM), videoconferencing, application sharing and netmeetings. For instance, IM is a form of real-time communication between two or more people based on typed text. The text is conveyed via computers connected over a network such as the Internet. There presently is a problem for real time communication over HTTP. Application Sharing is an element of remote access, falling under the collaborative software umbrella, which enables two or more users to access a shared application or document from their respective computers simultaneously in real time. Generally, the shared application or document will be running on a host computer, and remote access to the shared content will be provided to other users by the host user, many times over the Internet. There presently is a problem for real time communication over HTTP. The same holds for video conferencing, netmeetings and other RTC communications.

Hypertext Transfer Protocol (HTTP) is a method used to transfer or convey information on the World Wide Web or Internet. Its original purpose was to provide a way to publish and retrieve HTML pages.

Development of HTTP was coordinated by the W3C and the IETF culminating in the publication of a series of RFCs, most notably RFC 2616, which defines HTTP/1.1, the version of HTTP in common use today. (See http://tools.ietf.org/html/rfc2616).

HTTP is a request/response protocol between clients and servers. The originating client, such as a web browser, spider, an IM client, an application sharing client, netmeeting clients or other end-user tool is referred to as the user agent. The destination server, which stores or creates resources such as HTML files and images, is called the origin server. In between the user agent and origin server may be several intermediaries, such as proxies, gateways, and tunnels.

An HTTP client initiates a request by establishing a Transmission Control Protocol (TCP) connection to a particular port on a remote host. An HTTP server listening on that port waits for the client to send a request message. Once the request is received, the response is forwarded to the requester. However, the listening on the port by the server consumes server resources.

A plugin (or plug-in) is a computer program that interacts with a main application (a web browser or an email program, for example) to provide a certain, usually very specific, function. The code of the plugin or applet is downloaded from a web server and the browser either embeds the plugin or applet into a web page or opens a new window showing the plugin's or applet's user interface. It is desirable to provide HTTP-based RTC without requiring any plugins or applets, to browser's user.

In FIG. 1, a basic RTC System 101 is shown. RTC system 101 has Client 100, Server 102 and Client 104. Client 100 communicates with Client 104 through Server 102 and, in this example, in an RTC communication. Alternatively, Client 100 and Client 104 may be connected directly for RTC communication. Server 102 is shown within a Network 108 which may be of the many various forms such as Internet, local area network (LAN), MAN, etc. Server 102 has an Interface (I/F) 114 and I/F 116 for interfacing with Client 100 and Client 104. Server 102 further has an RTC Processor 118 for processing RTC communications between Client 100 and Client 104.

Client 100 has an I/F 120 for interfacing with the Network 108 and Server 102. Likewise, Client 104 has an I/F 122 for interfacing with the Network 108 and Server 102. Client 100 has an RTC Component 110 for providing RTC communications 130 with Client 104 through the Network 108 and Server 102. Likewise, Client 104 has an RTC Component 112 for providing RTC communications 130 with Client 100 through the Network 108 and Server 102.

Many times a Client needs an RTC Plug-in 132 to be dropped to the Client 100, 104 from the Server 102 (or elsewhere) so that the RTC can be completed. However, Download Time 134 can cause time problems as well as bandwidth problems for both the Client 100, 104 and the Server 102.

Presently, in order to have real-time collaboration, many methods are used. One example is to let the browser continually poll the server, triggered through some simple Java Script. This is shown in FIG. 2.

The term "polling" refers to actively sampling the status of an external device by a client program as a synchronous activity. An example of polling can be found in many online chat solutions where a server must queue messages and wait to be asked by a client. This is the most common mechanism for chat utilizing the AJAX programming web communications technique.

In FIG. 2, a system has Client 100, Server 102 and Client 104, and a Polling Method 200 has numerous messages being transported between the clients and the server. As an example, Client 100 and Client 104 are having a IM session. Client 100 sends Message 130 to Server 102. Client 104 polls the Server 102 for any updates using Poll Message 204. Server 102 forwards Message 130 to Client 104. Over Time 207, Client 104 polls the Server 102 for any further updates using Poll Messages 206, 210. As there were no updates, Server 102 forwards No Update Response 208, 212 to Client 104. Likewise, Client 100 sends Polls 216, 224, 228 requiring the Server 102 to process those polls to determine whether there have been any updates and responding with No Update Responses 208, 212, 218, 226.

This approach however has two big disadvantages: too much load on the server and too much latency when delivering updates from the server to the client. That is, each polling request from the client requires processing by the server. If the server has many clients, as is most common, continuous polling puts too much load on the server. Each polling request may require accessing databases, memory and the like consuming processing cycles and increasing load.

Regarding the latency, this is shown in FIG. 2 as well. Client 104 sends Message 214 to Server 102 for the purpose of forwarding to Client 100 in real-time. However, Server 102 must wait for a Poll 228. After some time, due to the processing of other clients' polls, Server 102 forwards Message 214 to the receiving client, Client 100 in this example. Latency period 230 shows that the Client 100 does not receive the message as quickly as is now expected.

From a user experience perspective, it is desirable that an event or notification be received immediately following the action that triggers the event. For example, assume user-A (Client 100) and user-B (Client 104) are in a text-based chat. User-A would prefer to receive some chat text as soon as user-B presses [enter].

One known solution is for each user's browser to keep an open HTTP GET request with the RTC service (e.g., by using common AJAX techniques). AJAX, shorthand for Asynchronous JavaScript and XML, is a web development technique for creating interactive web applications. The AJAX technique uses a combination of many things including the XMLHttpRequest object which is used to exchange data asynchronously with the web server. More information regarding AJAX can be found here: http://developer.mozilla.org/en/docs/AJAX:Getting_Started.

The RTC service commits a thread to handle each open request, and delays sending a response until updates are available for specific users. A thread in computer science is short for a thread of execution. Threads are a way for a program to split itself into two or more simultaneously (or pseudo-simultaneously) running tasks.

Multiple threads can be executed in parallel on many computer systems. This also causes a problem in that the server load is increased to deal with the various threads.

A solution is needed which will create less load on the server, provide immediate client response times, and not be gated by server-side resource limits. Further, there is a need for a system and method for achieving highly scalable real-time collaboration applications using HTTP.

A solution is needed which will solve the blocking issue to be discussed further below.

In view of the foregoing, a need exists to overcome these problems by providing a system and method for achieving highly scalable real-time collaboration applications using HTTP.

BRIEF SUMMARY OF THE INVENTION

The system and method of the present invention provides a highly scalable and highly responsive RTC service by using asynchronous or non-blocking I/O and HTTP response queuing.

The present invention provides two types of requests: an update request and a change request. An update request is a request used to fetch an update or change notification. A change request is a request to change some data related to the real-time session.

An Update Request is a request used to fetch an update or change notification. For a given RTC session, the server first checks whether any updates exist for an update request. If an update exists, the server code can send an immediate response to the client. However, if no update exists, the server code application sets a well-defined HTTP response header, and then responds. Once the server code application responds, all application server resources are freed, and the application server is free to handle the next requests without blocking any thread. The existence of the well-defined response header, allows the lower level networking code to queue the response, allowing it to be later addressed by the RTC session ID. This way, the HTTP response can be delayed (queued) without blocking a thread in the application server.

A Change Request is a request used to change some data related to the real-time session. Such requests would typically be tied to an action within a given RTC session (e.g., adding text to a chat, changing a slide, etc.). When these actions are sent to the server, the server-side application can determine whether the request affects the queued responses that are awaiting change notifications. In the case of a change, the notification response is computed, and then an API call into the lower-level network flushes all queued responses awaiting updates in the session. Therefore this mechanism is used to trigger the responses to complete, thus providing immediate updates to clients.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

It is noted the drawings are intended to depict only typical aspects of the invention, and therefore should not be considered as limiting the scope of the invention. In the drawings, like numbering represents like elements between the drawings.

DETAILED DESCRIPTION OF THE INVENTION

As used herein, unless otherwise noted, the term "set" means one or more (i.e., at least one) and the phrase "any solution" means any now known or later developed solution. Additionally, the term "data store" means any type of memory, storage device, storage system, and/or the like, which can temporarily or permanently store electronic data, and which can be included in a storage and/or memory hierarchy (collectively referred to herein as a "memory hierarchy") for a computer system.

Figure 8:
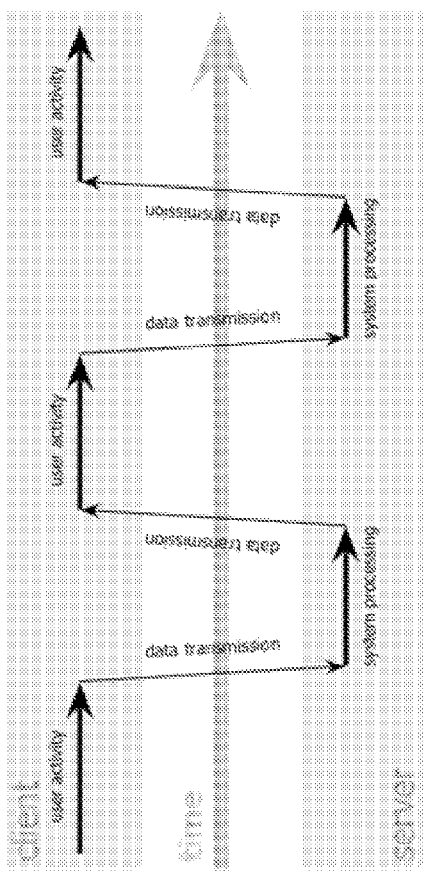
FIG. 8 shows a block diagram in a synchronous web application model.
Figure 9:
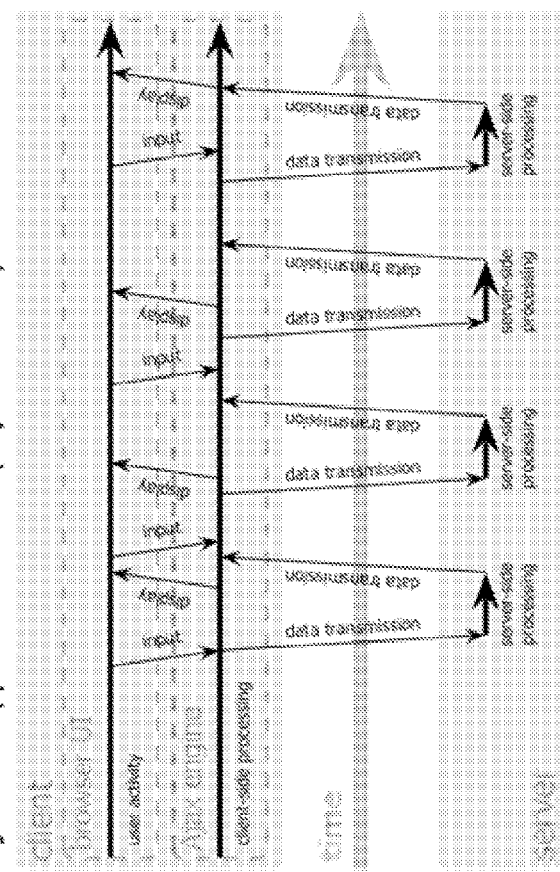
FIG. 9 shows a block diagram in an asynchronous web application model.

The invention achieves a highly scalable and responsive RTC service by using non/blocking I/O and HTTP response queuing. Asynchronous I/O, or non-blocking I/O, is a form of input/output processing that permits other processing to continue before the transmission has finished. The distinction between non-blocking or asynchronous I/O and synchronous I/O is shown in FIG. 8 and in FIG. 9. FIG. 8 illustrates the classic web model 800 (synchronous) while FIG. 9 illustrates the non-blocking or asynchronous model 900 such as provided by the AJAX web application model.

In the present invention, two types of requests are distinguished—Update Requests and Change Requests.

Figure 3:
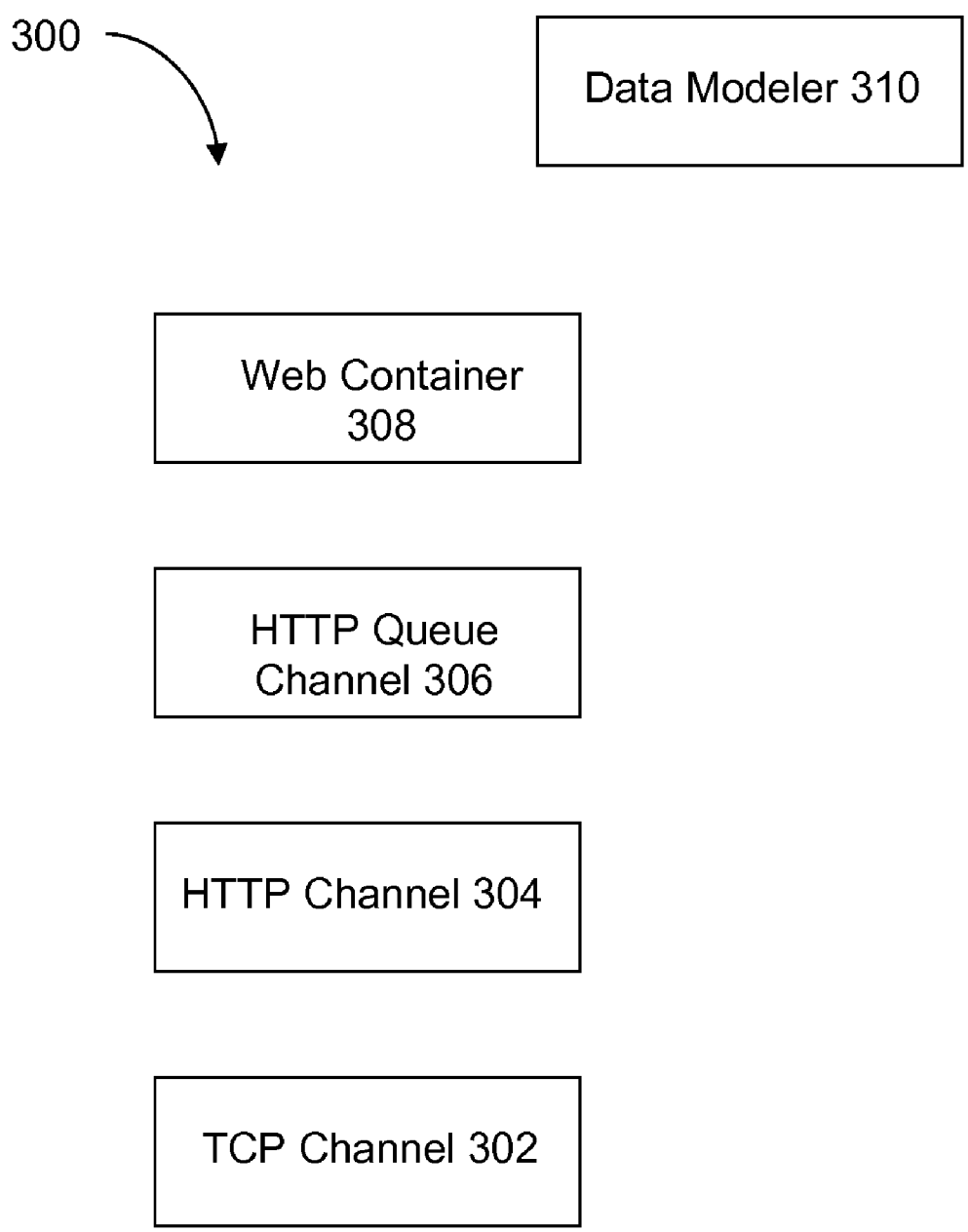
FIG. 3 shows a block diagram of the system for providing the highly scalable real-time collaboration using HTTP according to an embodiment of the present invention.

Update Requests: An Update Request is a request, such as that shown in FIG. 4 as 412, used to fetch an update or change notification. It is sent from the Client 100 to Server 102. Server 102 has a TCP Channel 302, as shown in FIG. 3, for receiving the Update Request 412 using the TCP protocol. Server 102 further has HTTP Channel 304, HTTP Queue Channel 306, Web Container 308 and Data Modeler 310. Update Request 412 is passed to the HTTP Queue Channel 404 from the HTTP Channel 402. Update Request 412 is then passed along to Web Container 406 and then along to RTC Servlet 408. The Data Model Interface 410 then receives the Update Request 412.

For a given RTC session, the Data Model Interface 410 first checks whether any updates exist for an update request. If an update exists, the server code can send an immediate response to the Client 100 shown as Response 420. However, if no update exists, the server application sets a well-defined HTTP response header, and then responds. This will be discussed in further detail below.

Once the application responds, all application server resources (memory, processing ability, etc.) are freed, and the application server 102 is free to handle the next requests without blocking any thread. The existence of the well-defined response header, allows the lower level networking code (ex: WAS Channel Framework) to queue the response, such as in HTTP Queue Channel 404, allowing it to be later addressed by the RTC session. This way, the HTTP response can be delayed (queued) without blocking a thread in the application server.

In Java 2 Platform, Enterprise Edition, a web container "implements the web component contract of the J2EE architecture". This contract specifies a runtime environment for web components that includes security, concurrency, lifecycle management, transaction, deployment, and other services. A web container provides the same services as a JSP container as well as a federated view of the J2EE platform APIs. A web container is provided by a web or J2EE server. More information can be found here. http://java.sun.com/javaee/reference/glossary/index.jsp JavaServer Pages (JSP) is a Java technology that allows software developers to dynamically generate HTML, XML or other types of documents in response to a Web client request. The technology allows Java code and certain predefined actions to be embedded into static content.

The JSP syntax adds additional XML-like tags, called JSP actions, to be used to invoke built-in functionality. Additionally, the technology allows for the creation of JSP tag libraries that act as extensions to the standard HTML or XML tags. Tag libraries provide a platform independent way of extending the capabilities of a Web server. JSPs are compiled into Java Servlets by a JSP compiler. A JSP compiler may generate a servlet in Java code that is then compiled by the Java compiler, or it may generate byte code for the servlet directly.

Figure 6:
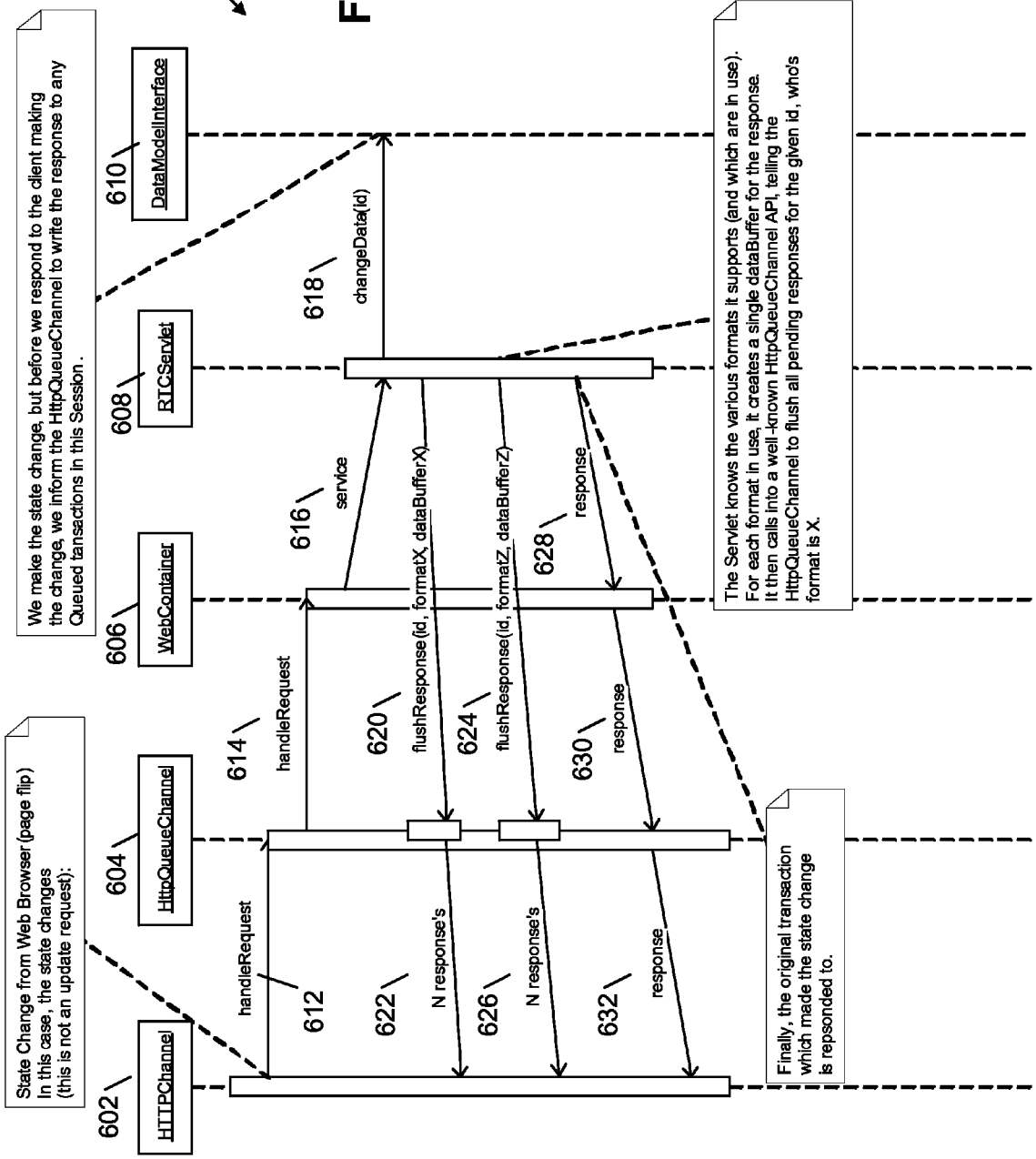
FIG. 6 shows an illustrative process flow diagram for receiving a state change from the client and responding to that state change according to an embodiment of the invention.

Change Requests: A Change Request 612 is a request used to change some data related to the real-time session as shown in FIG. 6. Change Request 612 is passed from HTTP Channel 602 to HTTP Queue Channel 604 to Web Container 606 to RTC Servlet 608 to Data Model Interface 610. Such requests would typically be tied to an action within a given RTC session (ex: adding text to a chat, changing a slide, etc). When these actions are sent to the server, the server-side application can determine whether the request affects the queued responses that are awaiting change notifications. In the case of a change, the notification response is computed, and then an API call into the lower-level network flushes all queued responses awaiting updates in the session. Therefore this mechanism is used to trigger the responses to complete, thus providing immediate updates to clients.

An example of a Server 102 which achieves this is the WebSphere Application Server's (WAS) Channel Framework Architecture (CFA), which enables the non-blocking network capabilities and seamless integration into the application server.

The HTTP Queue Channel 306 is in the existing HTTP Channel 304, and below the Web Container 308 using a hierarchical model. The CFA allows the HTTP Queue Channel 306 to expose APIs allowing it to seamlessly snap into the Web Container 308 above. In this sense the HTTP Queue Channel 306 has the ability to receive all inbound and outbound HTTP traffic.

The CFA offers a process for an HTTP Channel 304 to discriminate incoming traffic, thus allowing the HTTP Channel 304 to be bypassed. In the preferred embodiment, the HTTP Queue Channel 306 can optimally handle only HTTP traffic where the HTTP headers indicate the need for its use. For example, the client can set an HTTP header to indicate that the HTTP Queue Channel 306 should be used in the case of an RTC update request.

Figure 4:
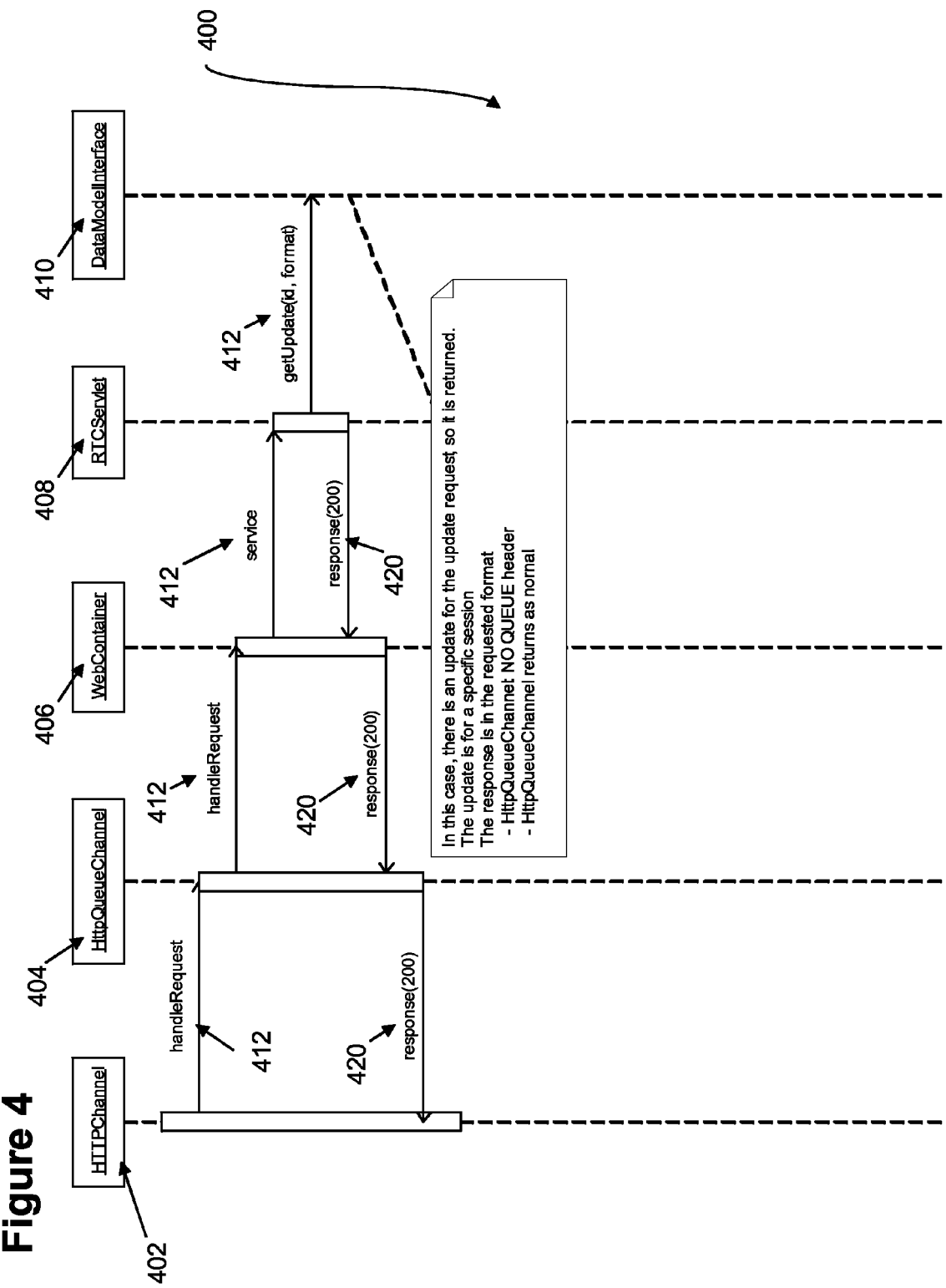
FIG. 4 shows an illustrative process flow diagram for receiving an update request in a real-time collaboration using HTTP and responding to that update request when there is an update according to an embodiment of the invention.

When some other request changes the data model, the queued updates are released as shown in FIG. 4. This diagram shows an update request being received by HTTP Channel 402. In this case, an Update 420 (data change) is currently available, so the Request 112 is immediately responded to with the Update 420 in the HTTP response.

Figure 5:
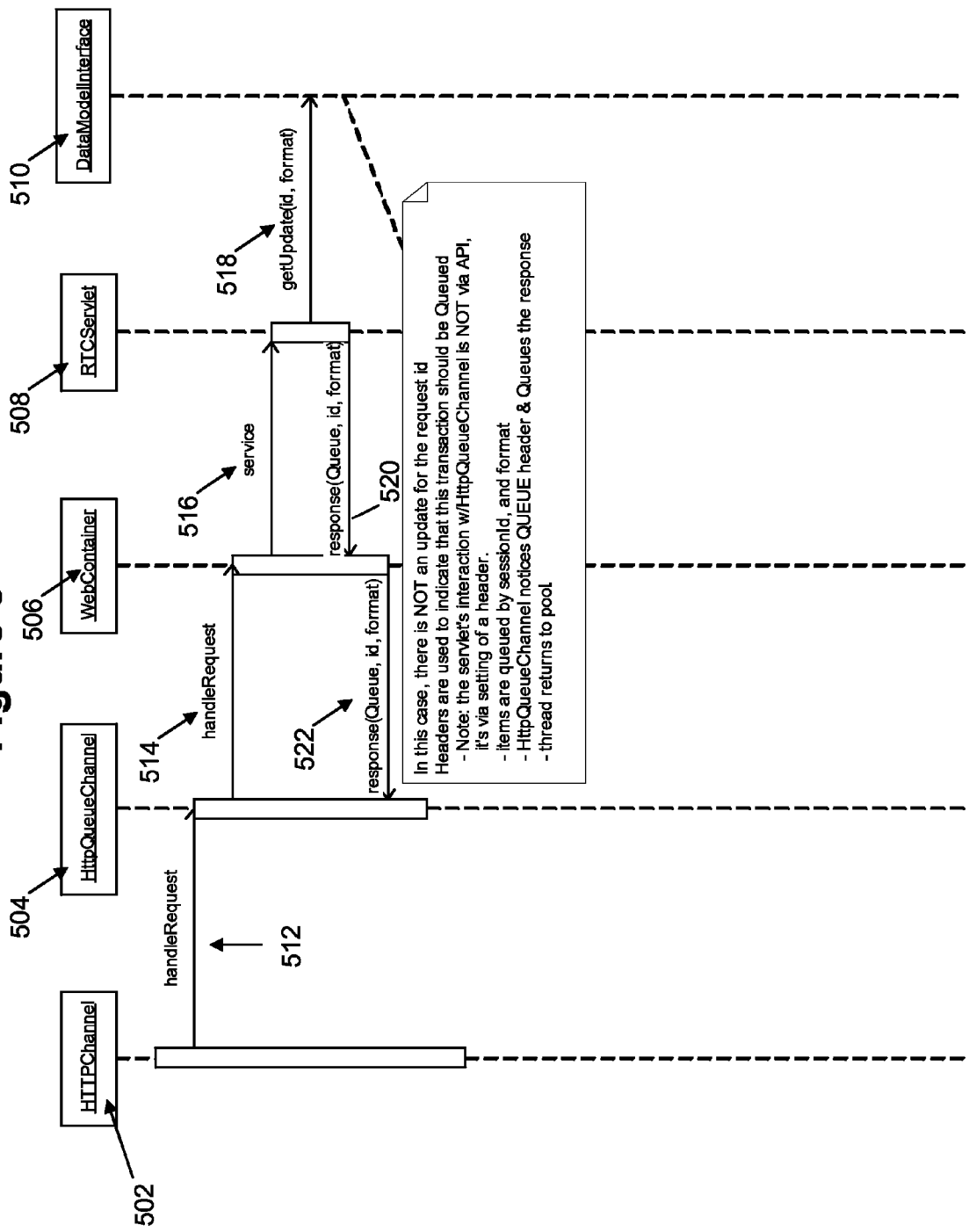
FIG. 5 shows an illustrative process flow diagram for receiving an update request in a real-time collaboration using HTTP and responding to that update request when there is no update to report according to an embodiment of the invention.

In FIG. 5, an Update Request 512 is being received by HTTP Channel 502. In this case, an update is not currently available, so responder (Data Model Interface 510) uses HTTP headers to respond indicating that the lower-level HTTP Queue Channel 504 should queue the response.

As shown in FIG. 5, the server-side resources are freed while the response is in the HTTP Queue Channel's 504 queue.

As shown in FIG. 6, a Change Request 612 is being received by HTTP Channel 602 which is passed on to HTTP Queue Channel 604, on to Web Container 606, RTC Servlet 608 and Data Model Interface 610 from an in-band remote user. In this case, the change informs the HTTP Queue Channel 604 that some change has occurred.

The invention allows the flushing of updates per session. A session could be an IM with another user, or a web-meeting. One user could have several different sessions with other users, each receiving changes and getting updates at their own rate.

The computed update is not limited in format. For example, one queued response might require XML data while another might require JSON, etc. The system and method of the present invention allows these formats to co-exist, and does not dictate the format to be used.

All responses may be flushed on a single thread using a single buffer, which is highly efficient with regard to server-side resources.

Figure 7:
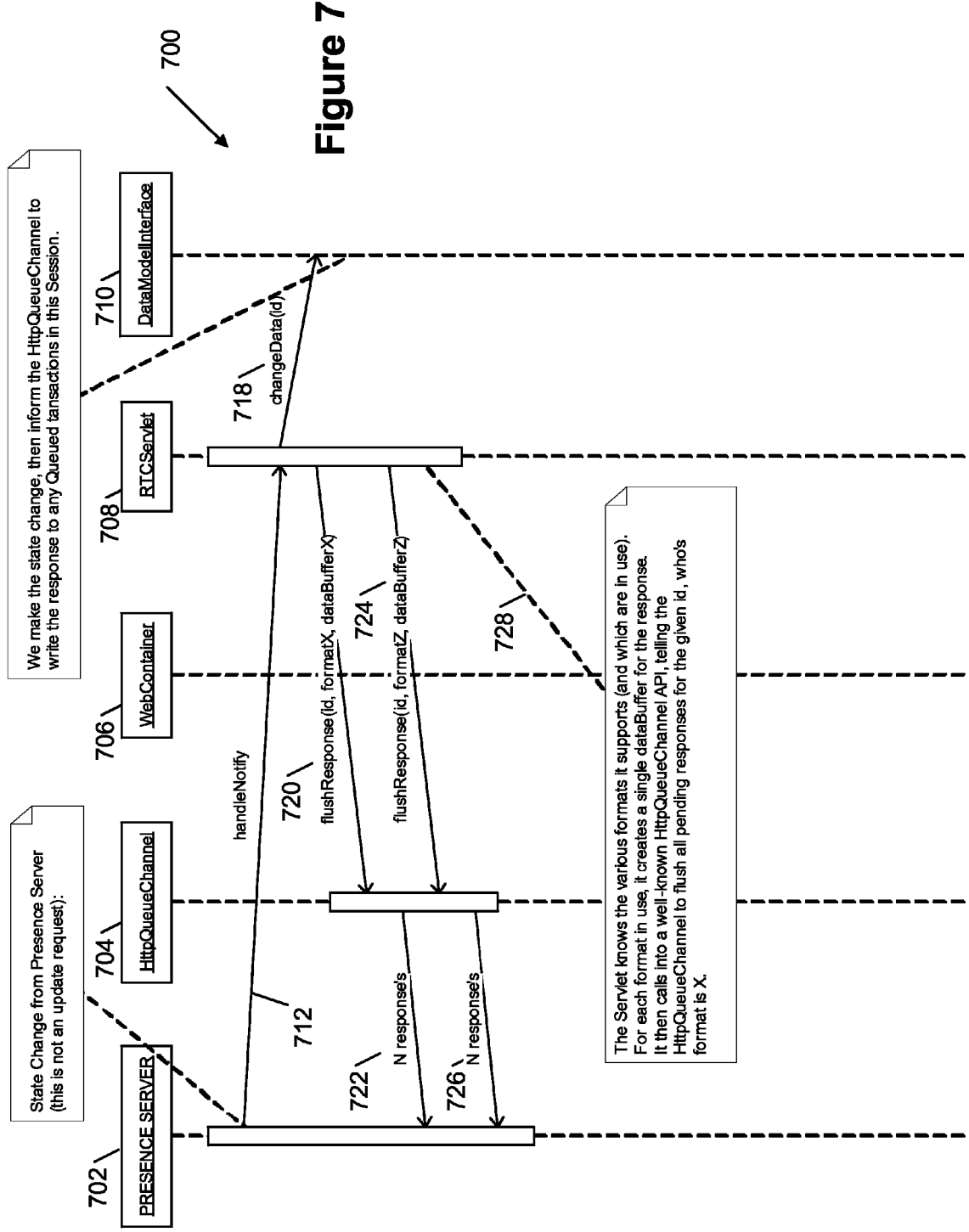
FIG. 7 shows an illustrative process flow diagram for receiving a change request from an out of band system.

FIG. 7 shows a change request being received from an out of band system, such as presence server. In this case, the change is similar to the case above. However, this is important to show, because the out-of-band system could be any sort of input device, sensor, etc.

While the invention is very resource friendly with respect to threads, it can use up a significant number of concurrent TCP/IP connections if clients send a request for the next update immediately after getting the response with the current update.

In order to minimize the number of required concurrent TCP/IP connections, the following algorithm allows the RTC server to control two types of time-outs.

Tto—How long the server will hold-on to a request.
Td—How long the client should delay before requesting the next update.

Figure 1:
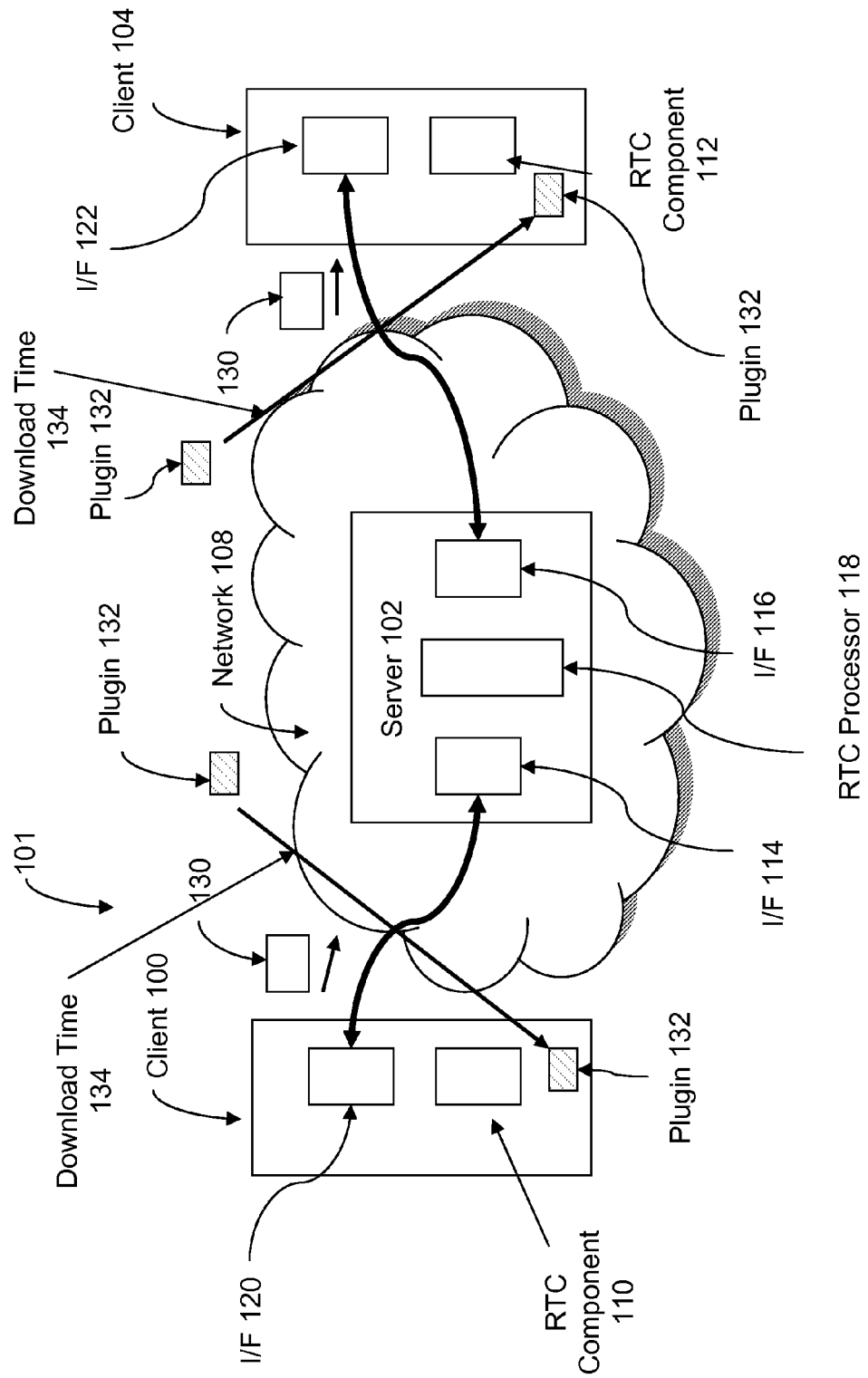
FIG. 1 is a block diagram showing the general components of a computer system that can be used to achieve highly scalable real-time collaboration using HTTP according to an embodiment of the present invention.
Figure 2:
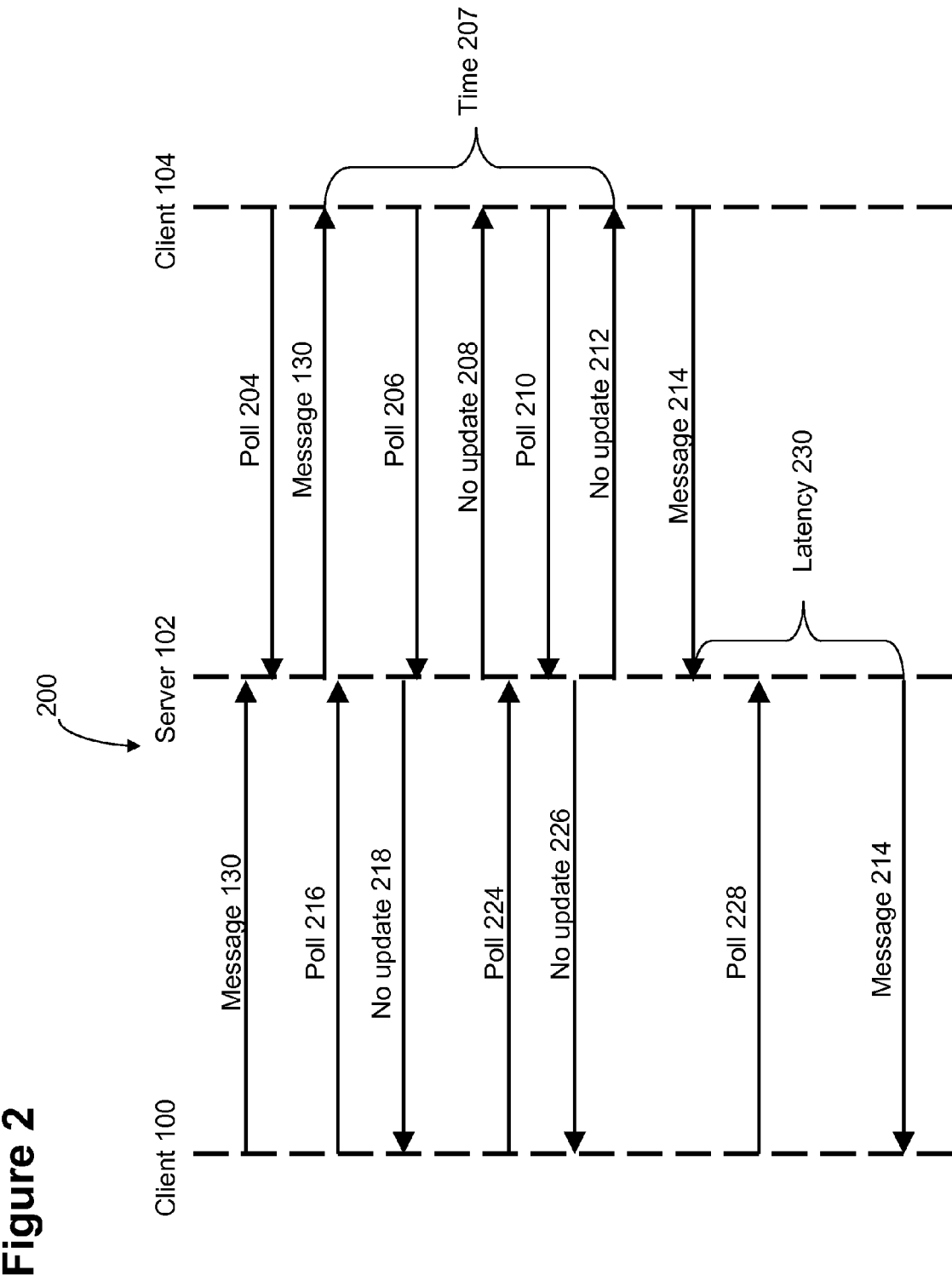
FIG. 2 shows an example of a prior art process showing the problems of present systems in collaboration using HTTP.
Figure 2A:
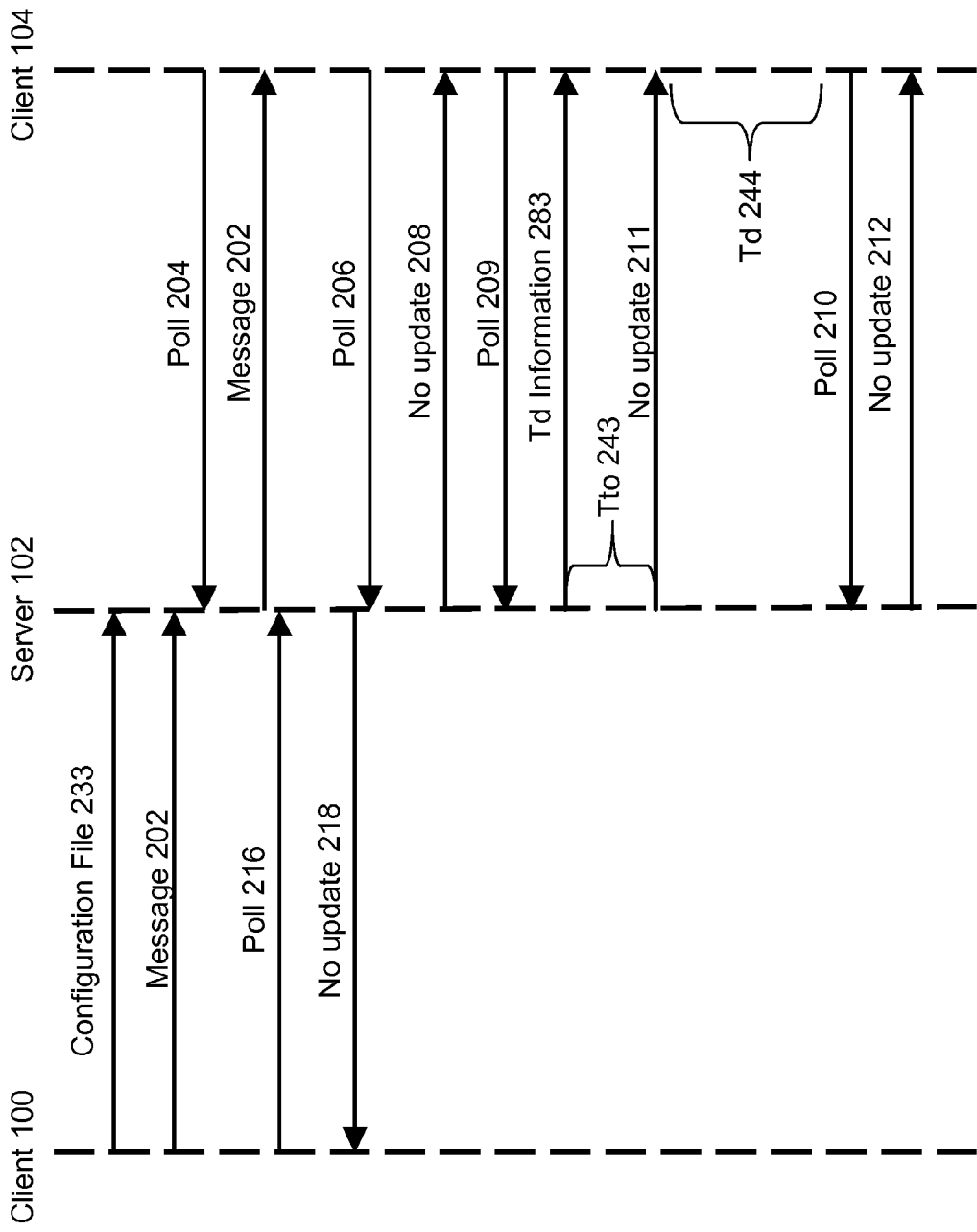
FIG. 2A shows one example of a process of the highly scalable real-time collaboration using HTTP according to an embodiment of the present invention.

This is shown in FIG. 2A where Tto 243 indicates how long the Server 102 will hold on to request Update Request 206. After that Tto time 243, Server 102 will send a response such as No Update 211. Td 244 indicates how long Client 104 needs to delay before sending another Update Request 210 to Server 102. This allows the Server 102 to process other requests without getting buried by Client Update Requests from Clients 100, 104.

The data for configuring the amount of time for Tto 243 and the Td 244 is sent by the Client 100 to the Server 102 in a Configuration File 233. Alternatively, it can be configured by the system administrator or automatically calculated by the Server 102.

As the Client 104 polls the Server 102 via Update Request 209, the Server 102 will hold the response (No Update 211) for Tto 243. Then the Server 102 informs the Client 104 when to poll again based on Td 244 after receiving the Update Request 209 and before making another poll request for updates. This is shown as Message Td Information 283. The delay times are calculated by the Server 102 based on its perception of resource limits. This way, the numbers can be adjusted, so that the number of concurrently required TCP/IP connections is minimized.

For any given request, a TCP/IP connection (through TCP Connection 302) will be held for at most Tto 243. Between requests no connection is required for the given client for at least Td 244. As a result, the percentage of connections in use is calculated by Tto 243/(Td 244+Tto 243).

For instance, set Tto 243=2 seconds (s) and Td 244=1 s. This would result in a 1 s update delay (max) but less than 0.5 s on average. Only 66% [2 s/(1 s+2 s)] of the otherwise concurrently required TCP/IP connections would be required.

In another example, setting Tto 243=0.5 s and Td 244=2 s. This would result in a 2 s update delay (max) and on average slightly better than that. Only 20% [0.5/(0.5+2)] of the otherwise concurrently required TCP/IP connections would be required.

Based on this, a Quality of Service (QOS) can be defined in terms of update delays. There are several ways this could work. One technique would based on user policy, where each user has a set quality of service (eg. "Gold", "Silver", "Bronze" and "Normal" users). Another technique would be specific to the application, or application instance, for example the web conference parameters could dictate the quality (e.g. "Real-time web conference", "Periodic Update", "No Guarantee", etc.)

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A System for achieving highly scalable real time collaboration (RTC) applications using hypertext transfer protocol for establishing and managing an RTC session between at least a First Client and a Second Client, the System having:
   First and Second Client Interfaces, for receiving from the First and Second Clients, respectively, Update Requests and Change Requests, each Update Request being a request used to fetch data changes, if any, relating to the RTC session and each Change Request being a request used to indicate a data change related to the RTC session; and
   a Server RTC Processor, connected to the First and Second Client Interfaces, for:
      determining whether any data changes related to the RTC session exist upon receiving an Update Request and, if so, sending an immediate response with the data changes to the update requesting client and, if not, setting a well defined hypertext transfer protocol response header, the setting signaling the lower level network code to queue the Update Request and sending an Update Response to the update requesting client indicating that no data changes related to the RTC session presently exist, wherein the setting a well-defined hypertext transfer protocol response header thereby allows the response to be later addressed by an RTC session ID and a format which identify the RTC session, and
      determining, based upon the well defined hypertext transfer protocol response header, whether the Change Request is related to any queued Update Requests which are awaiting data changes in the RTC session and, if so, immediately providing the data changes to the update requesting client, wherein the Server RTC Processor provides, in response to each Change Request, the data changes to the update requesting client by making an API call into the lower-level network to flush all queued Update Requests awaiting data changes in the RTC session, wherein the flush is performed in any format, on a single thread, and using a single buffer.

2. The System of claim 1 wherein the Server RTC Processor, after receiving an Update Request from the Second Client, delays sending an Update Response to the Second Client for a period of time (Tto), Tto being based upon configuration data.

3. The System of claim 2 wherein the Server RTC Processor indicates to First and Second Clients to delay sending an Update Request for a period of time (Td), Td being based upon configuration data.

4. A method, in a system, for achieving highly scalable real time collaboration (RTC) applications using hypertext transfer protocol for establishing and managing an RTC session between at least a First Client and a Second Client, the system having First and Second Client Interfaces and a Server RTC Processor, connected to the First and Second Client Interfaces, the method having the steps of:
   receiving, at the First and Second Client Interfaces from the First and Second Clients, respectively, Update Requests and Change Requests, each Update Request being a request used to fetch data changes, if any, relating to the RTC session and each Change Request being a request used to indicate a data change related to the RTC session;
   determining whether any data changes related to the RTC session exist upon receiving an Update Request, if so, sending an immediate response with the data changes to the update requesting client, and if not, setting a well defined hypertext transfer protocol response header, the setting signaling the lower level network code to queue the Update Request and sending an Update Response to the update requesting client indicating that no data changes related to the RTC session presently exist, wherein the setting a well-defined hypertext transfer protocol response header thereby allows the response to be later addressed by an RTC session ID and a format which identify the RTC session; and determining, based upon the well defined hypertext transfer protocol response header, whether the Change Request is related to any queued Update Requests which are awaiting data changes in the RTC session and, if so, immediately providing the data changes to the update requesting client, wherein the Server RTC Processor provides, in response to each Change Request, the data changes to the update requesting client by making an API call into the lower-level network to flush all queued Update Requests awaiting data changes in the RTC session, wherein the flush is performed in any format, on a single thread, and using a single buffer.

5. The method of claim 4 further comprising the steps of receiving an Update Request from the Second Client, and delaying sending an Update Response to the Second Client for a period of time (Tto), Tto being based upon configuration data.

6. The method of claim 5 further comprising the step of indicating to the First and Second Clients to delay sending an Update Request for a period of time (Td), Td being based upon configuration data.

7. A computer software program comprising program code stored on a non-transitory computer-readable medium, which when executed, enables a computer system to implement a method for achieving highly scalable real time collaboration (RTC) applications using hypertext transfer protocol for establishing and managing an RTC session between at least a First Client and a Second Client, the system having First and Second Client Interfaces and a Server RTC Processor, connected to the First and Second Client Interfaces, the method having the steps of:

receiving, at the First and Second Client Interfaces from the First and Second Clients, respectively, Update Requests and Change Requests, each Update Request being a request used to fetch data changes, if any, relating to the RTC session and each Change Request being a request used to indicate a data change related to the RTC session;

determining whether any data changes related to the RTC session exist upon receiving an Update Request, if so, sending an immediate response with the data changes to the update requesting client, and if not, setting a well defined hypertext transfer protocol response header, the setting signaling the lower level network code to queue the Update Request and sending an Update Response to the update requesting client indicating that no data changes related to the RTC session presently exist, wherein the setting a well-defined hypertext transfer protocol response header thereby allows the response to be later addressed by an RTC session ID and a format which identify the RTC session; and determining, based upon the well defined hypertext transfer protocol response header, whether the Change Request is related to any queued Update Requests which are awaiting data changes in the RTC session and, if so, immediately providing the data changes to the update requesting client, wherein the Server RTC Processor provides, in response to each Change Request, the data changes to the update requesting client by making an API call into the lower-level network to flush all queued Update Requests awaiting data changes in the RTC session, wherein the flush is performed in any format, on a single thread, and using a single buffer.

8. The computer program of claim 7 further comprising the steps of receiving an Update Request from the Second Client, and delaying sending an Update Response to the Second Client for a period of time (Tto), Tto being based upon configuration data.

9. The computer program of claim 8 further comprising the step of indicating to the First and Second Clients to delay sending an Update Request for a period of time (Td), Td being based upon configuration data.

* * * * *